(12) United States Patent
Marutzky (10) Patent No.: US 11,511,862 B2
(45) Date of Patent: Nov. 29, 2022

(54) EXTENDABLE ARMREST WITH AUTOMATIC RETRACTION FEATURES

(71) Applicant: AMI Industries, Inc., Colorado Springs, CO (US)

(72) Inventor: Kyler J. Marutzky, Colorado Springs, CO (US)

(73) Assignee: AMI Industries, Inc., Colorado Springs, CO (US)

(*) Notice: Subject to any disclaimer, the term of this patent is extended or adjusted under 35 U.S.C. 154(b) by 125 days.

(21) Appl. No.: 17/163,789

(22) Filed: Feb. 1, 2021

(65) Prior Publication Data

US 2022/0242575 A1 Aug. 4, 2022

(51) Int. Cl.
*B64D 11/06* (2006.01)

(52) U.S. Cl.
CPC ........ *B64D 11/0644* (2014.12); *B64D 11/064* (2014.12); *B64D 11/0691* (2014.12)

(58) Field of Classification Search
CPC .............. B64D 11/064; B64D 11/0644; B64D 11/0691
USPC .............................................. 297/14, 411.32
See application file for complete search history.

(56) References Cited

U.S. PATENT DOCUMENTS

| 2,583,372 | A | | 1/1952 | Hall | |
|---|---|---|---|---|---|
| 3,093,414 | A | * | 6/1963 | Eames | .................... A47C 1/126 297/14 |
| 3,655,968 | A | | 4/1972 | Moore et al. | |
| 4,913,487 | A | * | 4/1990 | Breckel | .............. B64D 11/0691 297/14 |
| 5,853,220 | A | | 12/1998 | Gulich et al. | |
| 6,220,660 | B1 | | 4/2001 | Bedro et al. | |
| 8,544,945 | B2 | | 10/2013 | King | |
| 9,981,585 | B2 | | 5/2018 | Attala | |
| 10,239,434 | B2 | | 3/2019 | Gomez et al. | |
| 2016/0376007 | A1 | * | 12/2016 | Meindlhumer | .... B64D 11/0644 297/14 |
| 2018/0022247 | A1 | | 1/2018 | Attala | |
| 2018/0312258 | A1 | * | 11/2018 | Itzinger | .............. B64D 11/0644 |

FOREIGN PATENT DOCUMENTS

| CN | 104473479 | B | | 2/2017 | |
|---|---|---|---|---|---|
| DE | 102005006977 | A1 | | 8/2006 | |
| DE | 102010035995 | B4 | * | 8/2012 | ............. A47C 1/121 |
| EP | 1055552 | B1 | | 10/2004 | |
| EP | 3072815 | A1 | | 9/2016 | |

(Continued)

OTHER PUBLICATIONS

Extended Search Report in European Application No. 22152538.1 dated Aug. 9, 2022, 7 pages.

*Primary Examiner* — Anthony D Barfield (74) *Attorney, Agent, or Firm* — Suiter Swantz pc llo (57) ABSTRACT

An aircraft seat system is disclosed, in accordance with one or more embodiments of the present disclosure. In one embodiment, the aircraft seat system includes a seat casement; a headrest portion; a seat back portion; a seat pan; and one or more armrests pivotably coupled to one or more portions of the seat casement. In another embodiment, the one or more armrests include an armrest body; a rotator link system; and a pivot link system. In another embodiment, the pivot link system may be configured to pivotably extend the armrest cap and pivotably retract the armrest cap.

15 Claims, 8 Drawing Sheets

(56) References Cited

FOREIGN PATENT DOCUMENTS

| | | |
|---|---|---|
| EP | 3871977 A1 | 9/2021 |
| KR | 100267114 B1 | 10/2000 |
| KR | 1020090117367 A | 11/2009 |

\* cited by examiner

EXTENDABLE ARMREST WITH AUTOMATIC RETRACTION FEATURES

BACKGROUND

Select aircraft seats may include armrest extension systems that rely on friction-based components that contain a multitude of parts, and that are prone to wear and issues upon repeated use. Additionally, when the aircraft seats are configured to be stowable (e.g., include one or more collapsible portions intended to reduce the amount of space occupied by the seat when not in use), existing aircraft seat systems do not include automatic retraction features to automatically retract portions of the armrest.

SUMMARY

An aircraft seat system is disclosed, in accordance with one or more embodiments of the present disclosure. In one embodiment, the aircraft seat system includes a seat casement; a headrest portion; a seat back portion; a seat pan pivotably coupled to one or more portions of the seat casement; and one or more armrests pivotably coupled to one or more portions of the seat casement via a pivot pin, wherein the one or more armrests are configured to be retractable upon a pivotable actuation of the seat pan. In another embodiment, the one or more armrests include an armrest body having a down stop pocket at a first end of the armrest body; a rotator link system kinematically coupled to the armrest body and an armrest cap; and a pivot link system kinematically coupled to the armrest body and the armrest cap. In another embodiment, the pivot link system may be configured to pivotably extend the armrest cap along a length of the armrest body toward a second end of the armrest body; and pivotably retract the armrest cap along the length of the armrest body toward the first end of the armrest body.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

Figure 1A:
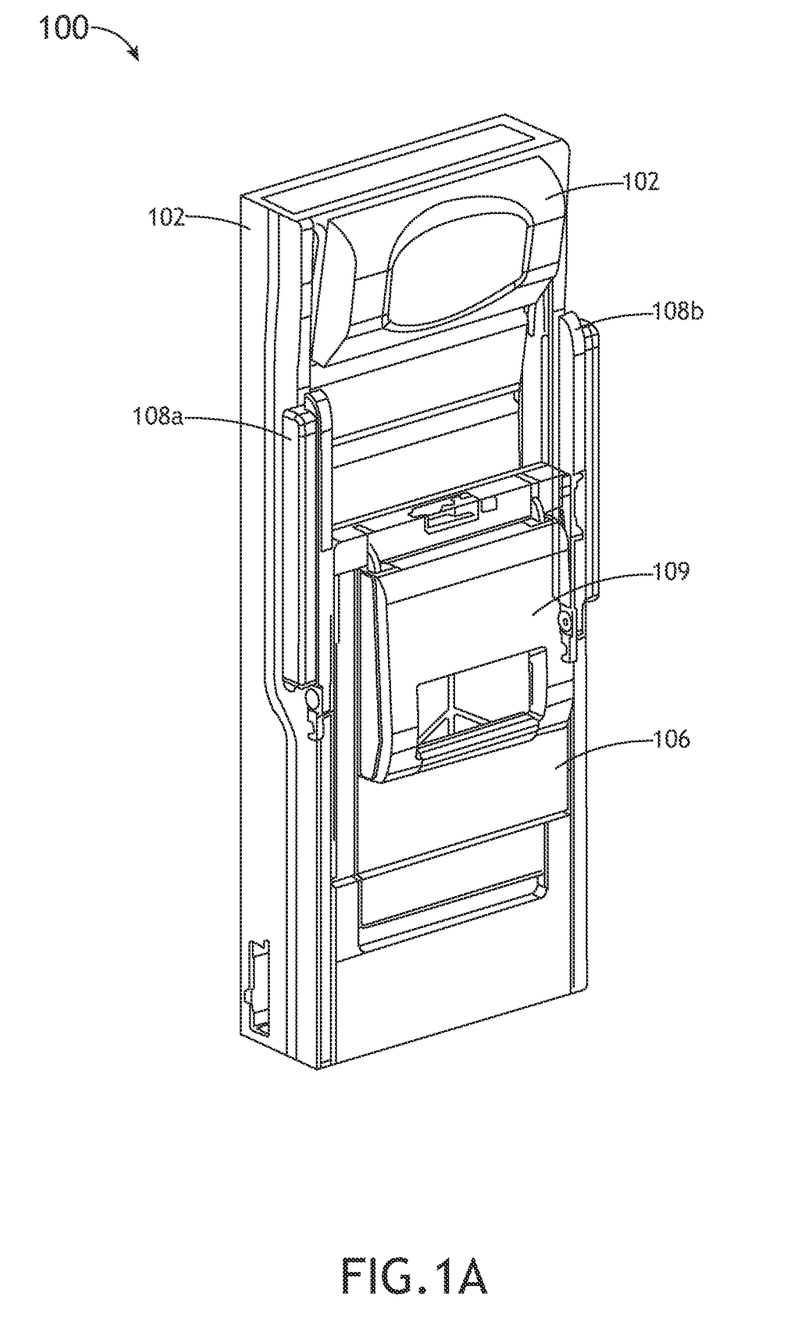
FIG. 1A illustrates a perspective view of an aircraft seat system, in accordance with one or more embodiments of the disclosure.
Figure 1B:
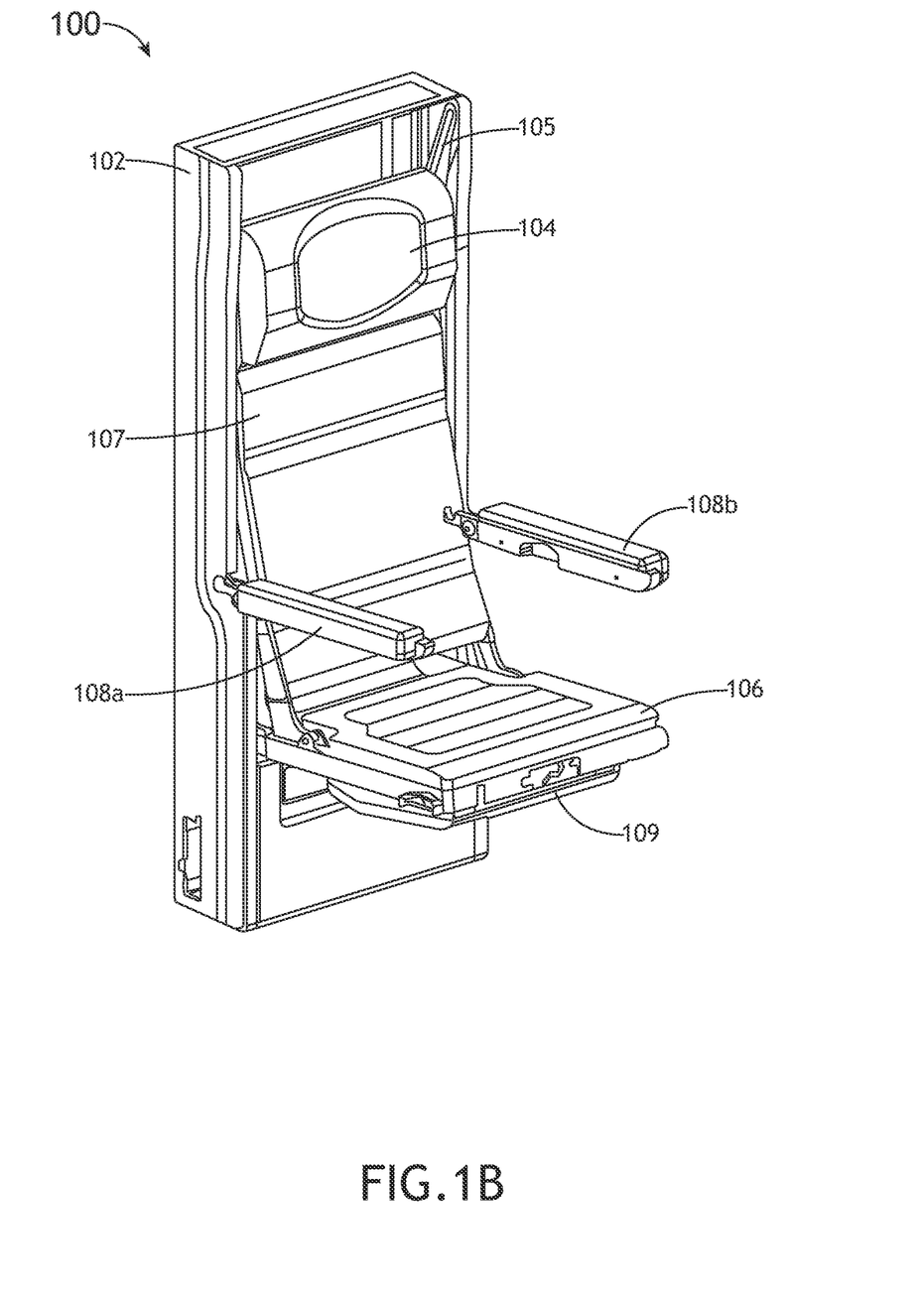
FIG. 1B illustrates a perspective view of an aircraft seat system, in accordance with one or more embodiments of the disclosure.
Figure 1C:
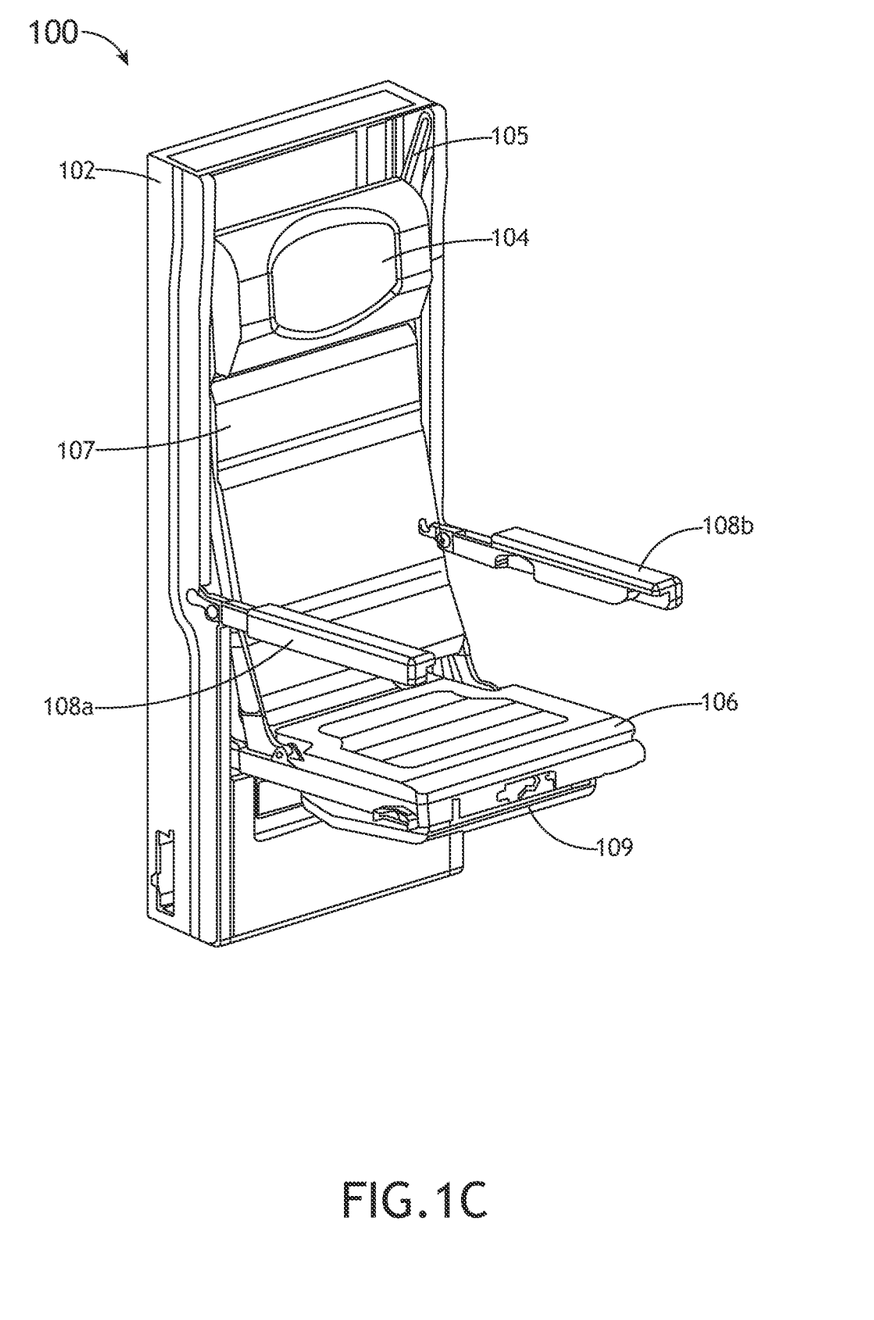
FIG. 1C illustrates a perspective view of an aircraft seat system, in accordance with one or more embodiments of the disclosure.

FIGS. 1A-1C in general illustrate an aircraft seat system 100, in accordance with one or more embodiments of the disclosure.

The aircraft seat system 100 may include a seat encasement 102. The seat encasement 102 may be coupled to one or more portions of an aircraft cabin, including, without limitation, one or more portions of a passenger compartment and/or one or more portions of a crew compartment (e.g., crew seating area, galley, crew rest area, or the like). The seat encasement 102 may be configured to house a headrest portion 104 and a seatback portion 107. For example, each of the headrest portion 104 and the seatback portion 107 may be slidably coupled to one or more portions of the seat encasement 102. By way of another example, each of the headrest portion 104 and the seatback portion 107 may be coupled to one or more portions of the seat encasement 102 via one or more slide rails (e.g., headrest slide rails 105 in the case of the headrest portion 105 or seatback slide rails in the case of the seatback portion 107 (not shown)). In this regard, the headrest portion 104 may be configured to slidably actuate along a length of the headrest slide rails 105, and the seatback portion 107 may be configured to slidably actuate along a length of the seatback slide rails. It is noted that the headrest slide rails 105 and the seatback slide rails are not limited to slide rails. For example, the headrest slide rails 105 and the seatback slide rails may include any mechanism configured to allow the headrest portion 105 and the seatback portion 107, respectively, to slidably actuate along one or more portions of the seat encasement 102, including, without limitation, grooves.

The seat encasement 102 may be configured to house a seat pan 106. The seat pan 106 may be pivotably coupled to one or more portions of the seat encasement 102. For example, the seat pan 106 may be coupled to one or more portions of the seat encasement 102 by any mechanism known in the art to be suitable for the purposes contemplated by the present disclosure, including, without limitation, one or more pins, one or more axles, or one or more hinges. It is noted that, as used with respect to the seat pan 106, the term "pivotably" may refer to any translation of the seat pan 106 about an axis such that an angle between one or more portions of the seat encasement 102 and the seat pan 106 may be translatable between approximately zero degrees (as is shown in FIG. 1A) and approximately ninety degrees (as is shown in FIGS. 1B and 1C).

The seat pan 106 may be configured to house a collapsible footrest 109 pivotably coupled to one or more portions of the seat pan 106. For example, the collapsible footrest 109 may be coupled to one or more portions of the seat pan 106 by any mechanism known in the art to be suitable for the purposes contemplated by the present disclosure, including, without limitation, one or more pins, one or more axles, or one or more hinges. It is noted that, as used with respect to the collapsible footrest 109, the term "pivotably" may refer to any translation of the collapsible footrest 109 about an axis such that an angle between one or more portions of the seat pan 106 and the collapsible footrest 109 may be translatable between approximately zero degrees and approximately ninety degrees.

The seat encasement 102 may be configured to house one or more extendable armrests 108. For example, the seat encasement 102 may be configured to house extendable armrests 108a and 108b. It is noted that, while the present disclosure may refer to extendable armrests 108, extendable armrest 108a, and/or extendable armrest 108b, the embodiments of the present disclosure are not limited to extendable armrests 108, extendable armrest 108a, or extendable armrest 108b. For example, the term "extendable armrests 108" may refer to any combination of the extendable armrest 108a or the extendable armrest 108b. By way of another example, the terms "extendable armrest 108a" and "extendable armrest 108b" may refer to any combination of the extendable armrest 108a, the extendable armrest 108b, or the extendable armrests 108.

The one or more extendable armrests 108 may be configured to include one or more portions that is extendable. For example, FIG. 1B illustrates the one or more extendable armrests 108a and 108b in an unextended configuration. By way of another example, FIG. 1C illustrates the one or more extendable armrests 108a and 108b in an extended configuration. In this regard, one or more portions (e.g., an armrest cap, as described herein) of the one or more extendable armrests 108 may be reversibly extendable.

Figure 2A:
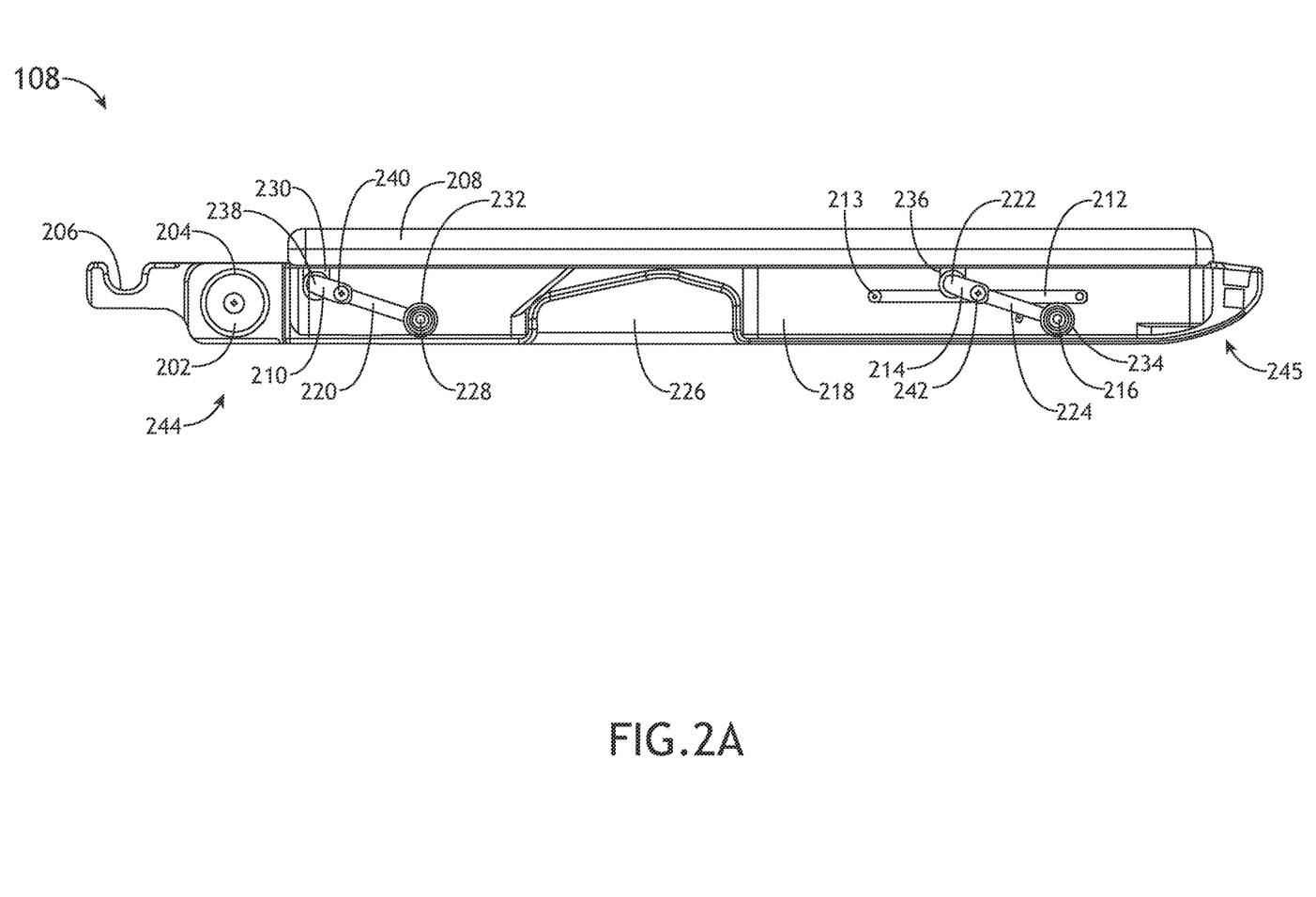
FIG. 2A illustrates a schematic view of an armrest of an aircraft seat system, in accordance with one or more embodiments of the present disclosure.
Figure 2B:
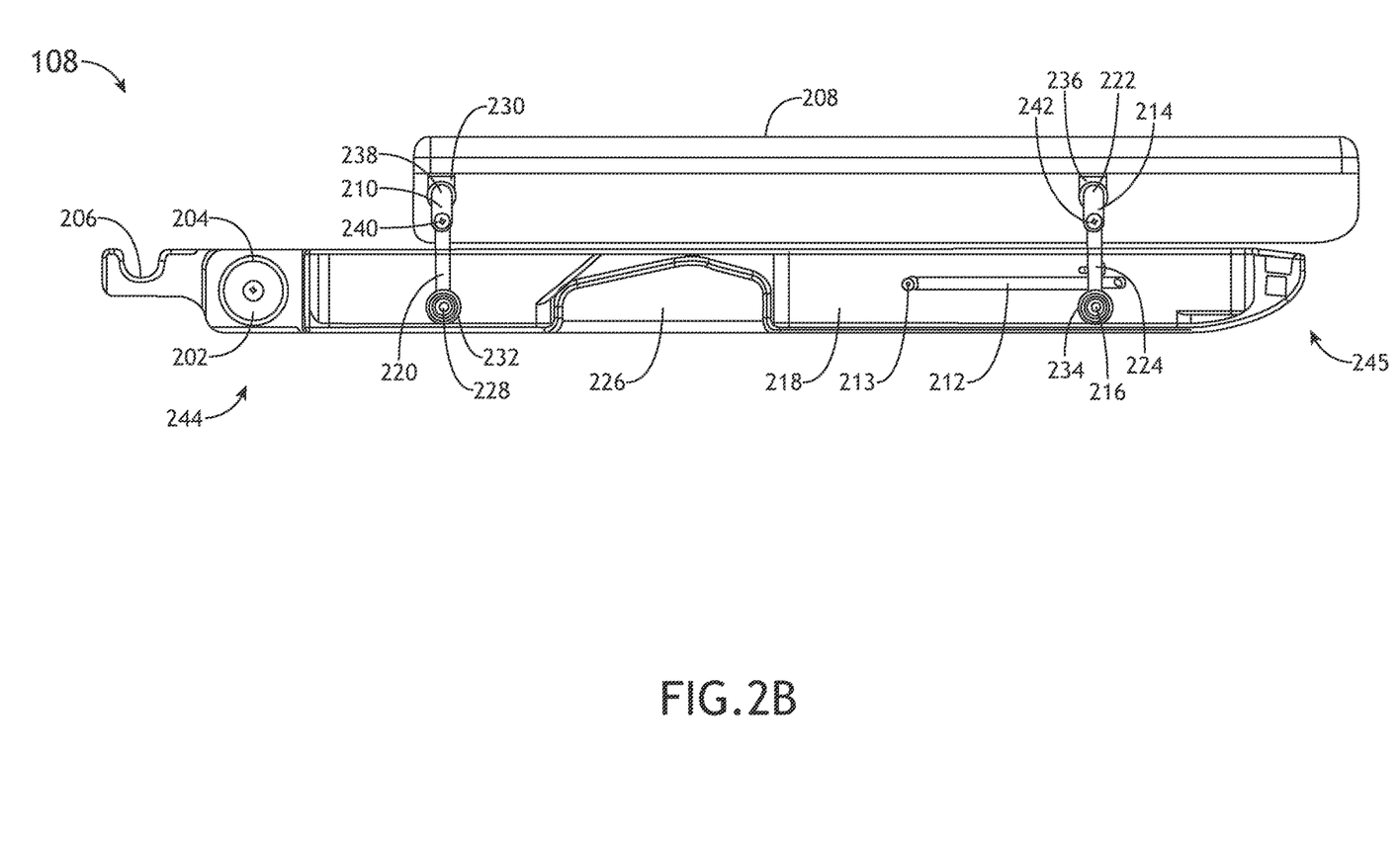
FIG. 2B illustrates a schematic view of an armrest of an aircraft seat system, in accordance with one or more embodiments of the present disclosure.
Figure 2C:
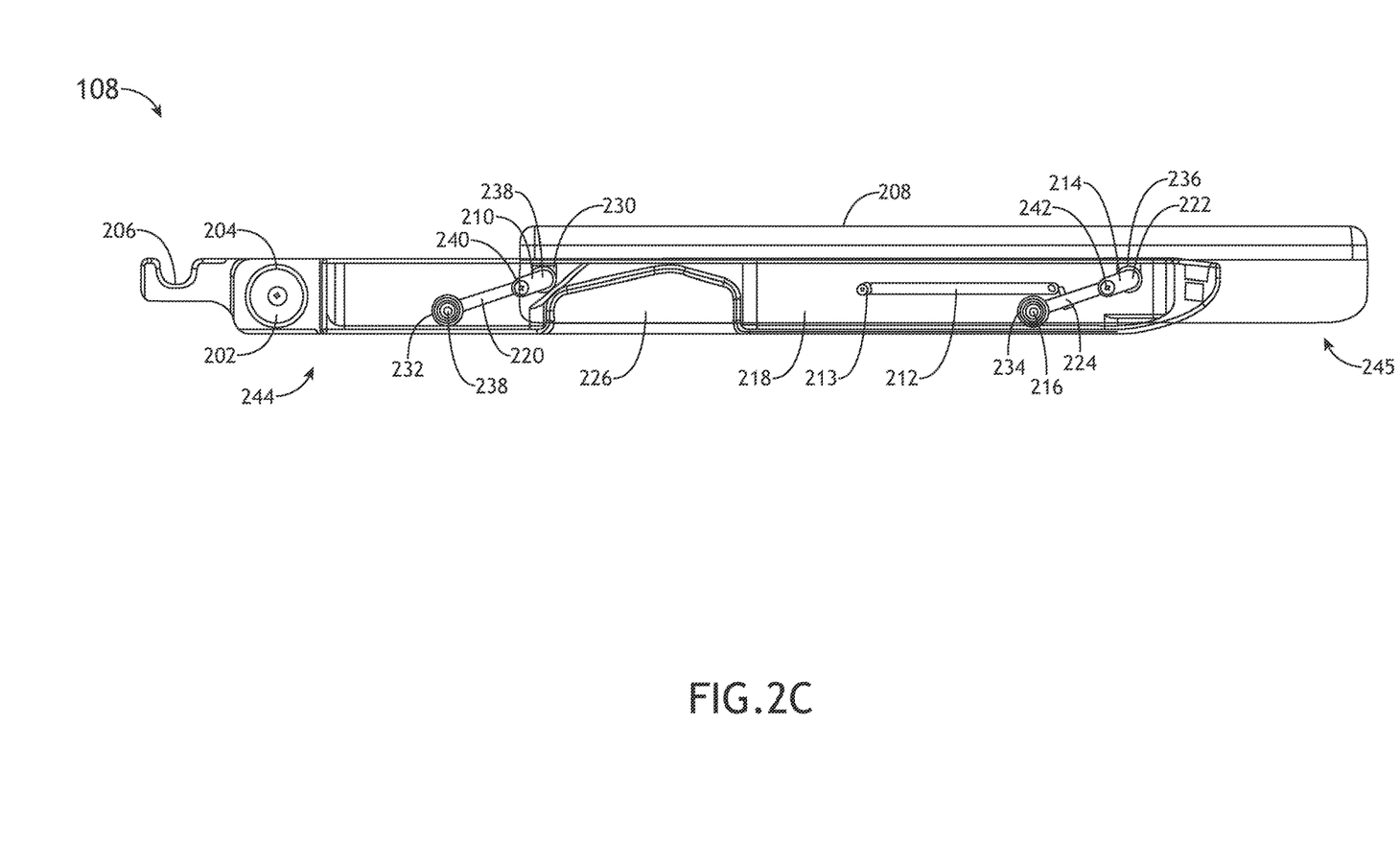
FIG. 2C illustrates a schematic view of an armrest of an aircraft seat system, in accordance with one or more embodiments of the present disclosure.

The one or more extendable armrests 108 may be pivotably coupled to one or more portions of the seat encasement 102. For example, as shown in FIGS. 2A through 2C, each of the one or more extendable armrests 108 may be pivotably coupled to one or more portions of the seat encasement 102 via a pivot pin 202. The pivot pin 202 may comprise any pin, axle, or other mechanism known in the art suitable for allowing the one or more extendable armrests 108 to pivotably translate about an axis such that an angle between one or more portions of the seat encasement 102 and the one or more extendable armrests 108 may be translatable between approximately zero degrees (as is shown in FIG. 1A) and approximately ninety degrees (as is shown in FIGS. 1B and 1C). The pivot pin 202 may be encased in or may include a pivot pin flange covering 204. For example, the pivot pin flange covering 204 may include any protective rim, collar, or other mechanism configured to strengthen and/or protect the pivotable coupling of the one or more extendable armrests 108 to the seat encasement 102 via the pivot pin 202 (e.g., the pivot pin flange covering 204 may be configured to reduce wear and tear on one or more portions of the pivotable coupling).

The one or more extendable armrests 108 may include an armrest cap 208 and an armrest body 218. The armrest cap 208 may be positioned in a plane normal to the armrest body 218 (e.g., above the armrest body 218). The armrest body 218 may include a first end 244 and a second end 245.

The armrest cap 208 may be configured to be pivotably extendable along a length of the armrest body 218. For example, the one or more extendable armrests 108 may include a pivot link system configured to extend the armrest cap 208 along a length of the armrest body 218 in the direction of the second end of the armrest body 245. In another embodiment, the pivot link system may be configured to retract the armrest cap 208 along a length of the armrest body 218 in a direction of the first end of the armrest body 244. The pivot link system may be kinematically coupled to the armrest body 218 and the armrest cap 208. For example, a plurality of components of the pivot link system may be configured to cause a pivotable extension and/or retraction of the armrest cap 208 via one or more kinematic translations of the plurality of components of the pivot link system.

The pivot link system may include an upper pivot link 214 and a lower pivot link 224. The upper pivot link 214 and the lower pivot link 224 may be kinematically coupled to each other via a center pivot link shaft 242. The center pivot link shaft 242 may include any one or more pins, axles, or other mechanisms known in the art to be suitable for the purposes contemplated by the present disclosure. Each of the upper pivot link 214 and the lower pivot link 224 may be configured to rotate about the center pivot link shaft 242. The center pivot link shaft 242 may include or may be surrounded by one or more pivot link flange coverings (e.g., any protective rim, collar, or other mechanism configured to strengthen and/or protect the kinematic coupling of the upper pivot link 214 to the lower pivot link 224).

The upper pivot link 214 may include any one or more links, bars, or other components, including, without limitation, one or more multi-bar kinematic links or cam mechanisms. The upper pivot link 214 may be kinematically coupled to an upper pivot link attachment 236 via an upper pivot link shaft 222. The upper pivot link 214 may be configured to rotate about the upper pivot link shaft 222. The upper pivot link attachment 236 may be fixably coupled to one or more portions of the armrest cap 208 via any means known in the art to be suitable for the purposes contemplated by the present disclosure, including, without limitation, a weld, a bolt, a screw, or other mechanism for fastening the upper pivot link attachment 236 to one or more portions of the armrest cap 208. The upper pivot link shaft 222 may include any one or more pins, axles, or other mechanisms known in the art to be suitable for the purposes contemplated by the present disclosure. The upper pivot link shaft 222 may include or may be surrounded by one or more upper pivot link flange coverings (e.g., any protective rim, collar, or other mechanism configured to strengthen and/or protect the kinematic coupling of the upper pivot link 214 to the upper pivot link attachment 236).

The lower pivot link 224 may include any one or more links, bars, or other components, including, without limitation, one or more multi-bar kinematic links or cam mechanisms. The lower pivot link 224 may be kinematically coupled to a lower pivot link attachment 234 via a lower pivot link shaft 216. The lower pivot link 224 may be configured to rotate about the lower pivot link shaft 216. The lower pivot link attachment 234 may be fixably coupled to one or more portions of the armrest cap 208 via any means known in the art to be suitable for the purposes contemplated by the present disclosure, including, without limitation, a weld, a bolt, a screw, or other mechanism for fastening the lower pivot link attachment 234 to one or more portions of the armrest cap 208. The lower pivot link shaft 216 may include any one or more pins, axles, or other mechanisms known in the art to be suitable for the purposes contemplated by the present disclosure. The lower pivot link shaft 224 may include or may be surrounded by one or more lower pivot link flange coverings (e.g., any protective rim, collar, or other mechanism configured to strengthen and/or protect the kinematic coupling of the lower pivot link 224 to the lower pivot link attachment 234).

The pivot link system may include a spring 212 fixably coupled to one or more portions of the armrest body 218 via a spring attachment 213. The spring attachment 213 may include a hook, weld, or other mechanism configured to fasten a first end of the spring to the armrest body 218. The spring 212 may be fixably coupled to one or more portions of at least one of the lower pivot link 224, the lower pivot link shaft 216, or the lower pivot link attachment 234.

The spring 212 may be configured to elastically extend along one or more portions of a length of the armrest body 218. For example, the spring 212 may be configured to elastically extend along one or more portions of a length of the armrest body 218 upon rotation of the lower pivot link 224 about the lower pivot link shaft 216. By way of another example, the spring 212 may be configured to elastically extend along one or more portions of a length of the armrest body 218 in a direction of the second end 245 of the armrest body 218.

In another embodiment, the spring 212 may be configured to elastically retract along one or more portions of a length of the armrest body 218. For example, the spring 212 may be configured to elastically tract along one or more portions of a length of the armrest body 218 upon rotation of the lower pivot link 224 about the lower pivot link shaft 216. By way of another example, the spring 212 may be configured to elastically retract along one or more portions of a length of the armrest body 218 in a direction of the second end 245 of the armrest body 218.

The spring 212 may include any elastic object configured to store mechanical energy. For example, the spring 212 may include a coil spring, a helical spring, a torsion spring, a volute spring, or other spring known in the art to be suitable for the purposes contemplated by the present disclosure. The spring 212 may be configured to have a spring constant (e.g., a force constant derived from one or more characteristics of the construction and/or material of the spring 212) that requires a certain amount of force to extend the spring 212. For example, in some embodiments, the spring 212 may be configured such that a relatively great amount of force is required to extend and/or retract the armrest cap 208 via the pivot link system. In other embodiments, the spring 212 may be configured such that a relatively low amount of force is required to extend and/or retract the armrest cap via the pivot link system.

In some embodiments, the one or more extendable armrests 108 may include a rotator link system configured to extend the armrest cap 208 along a length of the armrest body 218 in a direction of the second end of the armrest body 245. In another embodiment, the rotator link system may be configured to retract the armrest cap 208 along a length of the armrest body 218 in the direction of the first end of the armrest body 244. The rotator link system may be kinematically coupled to the armrest body 218 and the armrest cap 208. For example, a plurality of components of the rotator link system may be configured to cause a pivotable extension and/or retraction of the armrest cap 208 via one or more kinematic translations of the plurality of components of the rotator link system.

The rotator link system may include an upper rotator link 210 and a lower rotator link 220. The upper rotator link 210 and the lower rotator link 220 may be kinematically coupled to each other via a center rotator link shaft 240. The center rotator link shaft 240 may include any one or more pins, axles, or other mechanisms known in the art to be suitable for the purposes contemplated by the present disclosure. Each of the upper rotator link 210 and the lower rotator link 220 may be configured to rotate about the center rotator link shaft 240. The center rotator link shaft 240 may include or may be surrounded by one or more rotator link flange coverings (e.g., any protective rim, collar, or other mechanism configured to strengthen and/or protect the kinematic coupling of the upper rotator link 210 to the lower rotator link 220).

The upper rotator link 210 may include any one or more links, bars, or other components, including, without limitation one or more multi-bar kinematic links or cam mechanisms. The upper rotator link 210 may be kinematically coupled to an upper rotator link attachment 230 via an upper rotator link shaft 238. The upper rotator link 210 may be configured to rotate about the upper rotator link shaft 238. The upper rotator link attachment 230 may be fixably coupled to one or more portions of the armrest cap 208 via any means known in the art to be suitable for the purposes contemplated by the present disclosure, including, without limitation, a weld, a bolt, a screw, or other mechanism for fastening the upper rotator link attachment 230 to one or more portions of the armrest cap 208. The upper rotator link shaft 238 may include any one or more pins, axles, or other mechanisms known in the art to be suitable for the purposes contemplated by the present disclosure. The upper rotator link shaft 238 may include or may be surrounded by one or more upper rotator link flange coverings (e.g., any protective rim, collar, or other mechanism configured to strengthen and/or protect the kinematic coupling of the upper rotator link 210 to the upper rotator link attachment 230).

The lower rotator link 220 may include any one or more links, bars, or other components, including, without limitation one or more multi-bar kinematic links or cam mechanisms. The lower rotator link 220 may be kinematically coupled to a lower rotator link attachment 232 via a lower rotator link shaft 228. The lower rotator link 220 may be configured to rotate about the lower rotator link shaft 228. The lower rotator link attachment 232 may be fixably coupled to one or more portions of the armrest cap 208 via any means known in the art to be suitable for the purposes contemplated by the present disclosure, including, without limitation, a weld, a bolt, a screw, or other mechanism for fastening the lower rotator link attachment 232 to one or more portions of the armrest cap 208. The lower rotator link shaft 228 may include any one or more pins, axles, or other mechanisms known in the art to be suitable for the purposes contemplated by the present disclosure. The lower rotator link shaft 228 may include or may be surrounded by one or more lower rotator link flange coverings (e.g., any protective rim, collar, or other mechanism configured to strengthen and/or protect the kinematic coupling of the lower rotator link 220 to the lower pivot link attachment 232).

It is noted that the pivot link system and the rotator link system may work in tandem to extend and/or retract the armrest cap 208. For example, when a force is applied to a portion of the armrest cap 208 (e.g., a force in a direction of the first end 244), portions of each of the pivot link system and the rotator link system may be kinematically translated (e.g., rotated) such that the armrest cap 208 is extended. By way of another example, when a force is applied to a portion of the armrest cap 208 (e.g., a force in a direction of the second end 245), portions of each of the pivot link system and the rotator link system may be kinematically translated (e.g., rotated) such that the armrest cap 208 is retracted. It is noted that, in retracting the armrest cap 208, the spring 212 of the pivot link system may cause a portion of the retraction (e.g., the elastic force of the spring 212 may cause the armrest cap 208 to retract upon application of a force to the armrest cap 208 in the direction of the first end 244). In this regard, the pivot link system and the rotator link system may be configured to transform rotational motion (e.g. rotation of one or more components of either or both of the pivot link system or the rotator link system) into linear motion (e.g., extension and/or retraction of the armrest cap 208 along a length of the armrest body 218 in either a direction of the first end 244 or the second end 245).

Referring generally to FIGS. 2A through 2C, an extension operation of the one or more extendable armrests 108 is shown. FIG. 2A illustrates the one or more extendable armrests 108 in a non-extended state. In the non-extended state, the armrest cap 208 may be positioned atop (e.g., in a plane normal to) the armrest body 218. FIG. 2B illustrates the one or more extendable armrests 108 in a partially-extended state. In the partially-extended state, the armrest cap 208 may be positioned atop the armrest body 218 but may not be in contact with the armrest body 218. 9 In the partially-extended state, components of the pivot link system and the rotator link system may be rotated by between approximately 1 degree and approximately 90 degrees. In the partially-extended state, the spring 212 of the pivot link system may be partially stretched. It is noted that the application of force (e.g., by a user of the aircraft seat system 100) may be required for the one or more extendable armrests 108 to exist in the partially-extended state (i.e., to overcome the elastic force of the spring 212). As previously described, the amount of force required for the one or more extendable armrests 108 to exist in the partially-extended state (or to cause the one or more extendable armrests 108 to exist in the extended state, as shown in FIG. 2C) may vary depending on the spring constant of the spring 212. FIG. 2C illustrates the one or more extendable armrests 108 in an extended state. In the extended state, the armrest cap may be positioned atop the armrest body 218, but, relative to its position in the non-extended state, the armrest cap 208 may be translated along the length of the armrest body 218 in a direction of the second end 245. The armrest cap 208 may extend beyond the second end 245. In the extended state, components of the pivot link system and the rotator link system may be rotated by between approximately 1 degree and approximately 120 degrees.

In some embodiments, the one or more extendable armrests 108 may be configured to be retractable upon a pivotable actuation of the seat pan 106. For example, as shown generally in FIGS. 3A through 3D, the seat pan 106 may include a seat pan handle 302 configured to catch one or more portions of the one or more extendable armrests 108 upon a pivotable actuation of the seat pan 106. The seat pan handle 302 may comprise a cavity formed in one or more portions of the seat pan 106. By way of another example, in some embodiments, the one or more extendable armrests 108 may include an armrest pocket 226 (see FIGS. 2A through 2C) configured to receive one or more portions of the seat pan handle 302 when the seat pan 106 is in a fully collapsed state (as shown in FIG. 3D). The armrest pocket 226 may comprise a cavity formed in the armrest body 218.

Figure 3A:
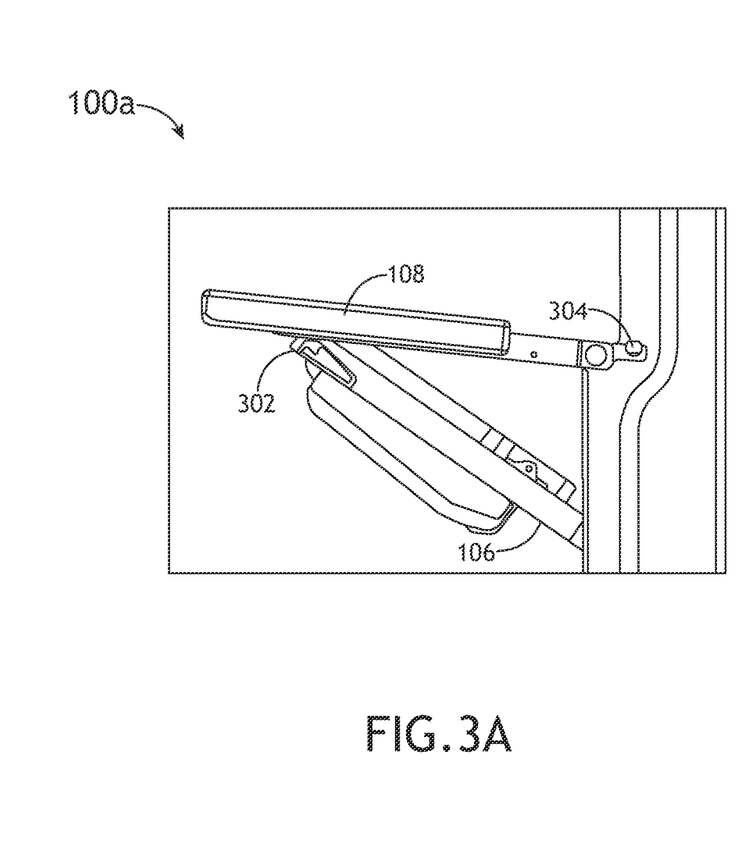
FIGS. 3A-3D illustrate a sequential, operational view of an aircraft seat system, in accordance with one or more embodiments of the disclosure.
Figure 3B:
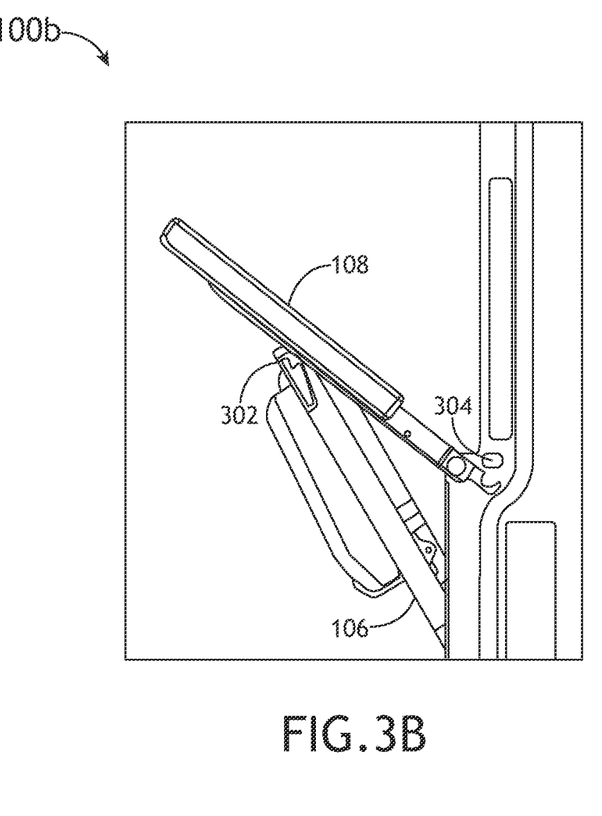
Figure 3C:
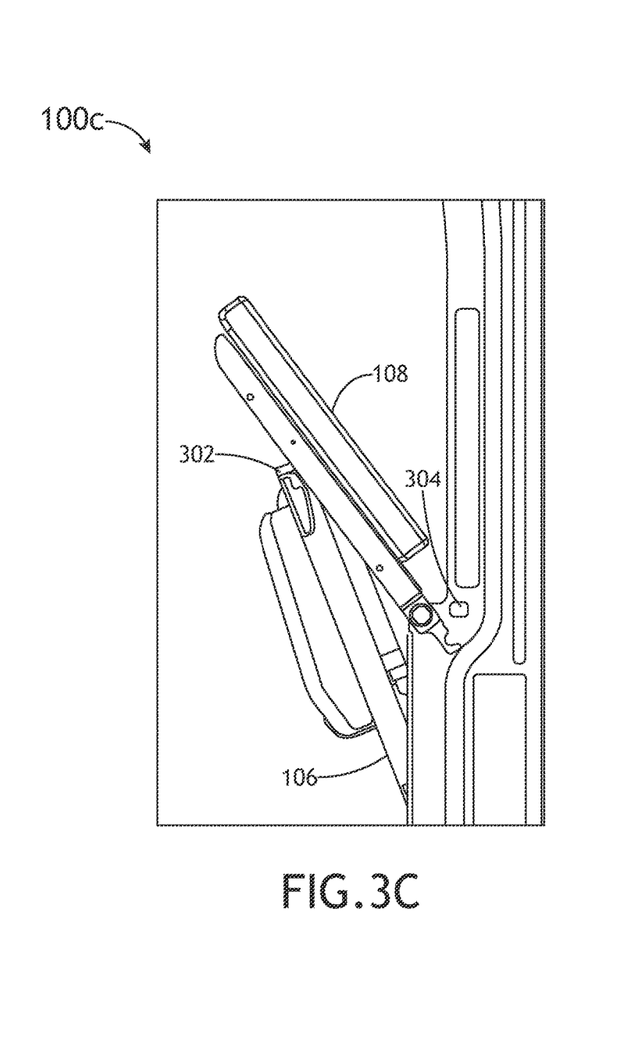
Figure 3D:
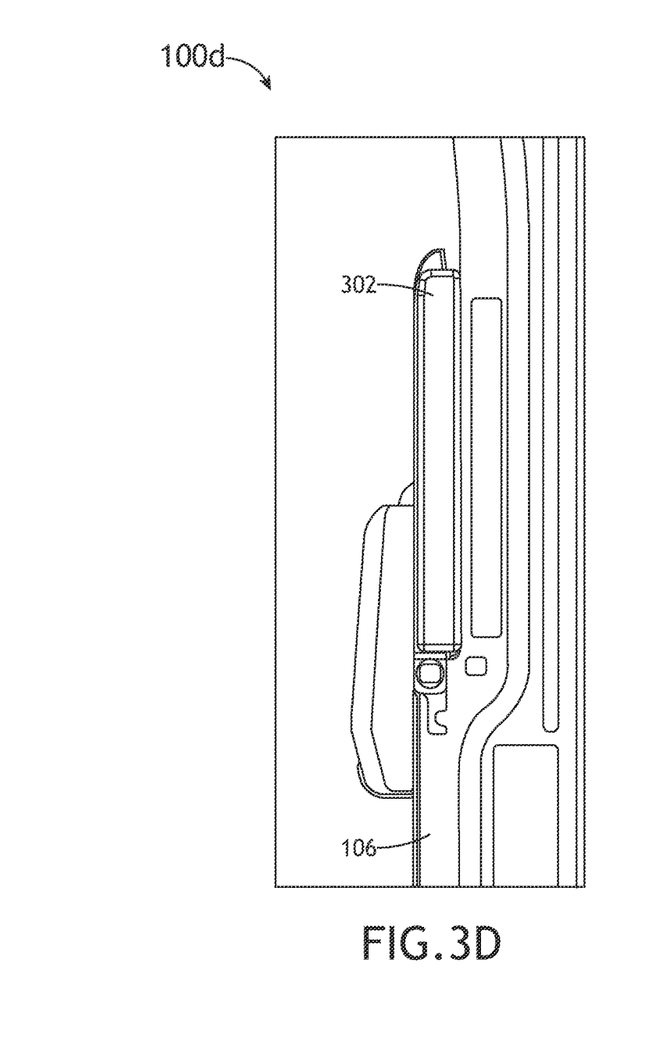

Referring generally to FIGS. 3A through 3D, a sequential, operational view of a retraction of the one or more extendable armrests 108 is shown. FIG. 3A illustrates an aircraft seat system 100a in a partially-retracted state (e.g., a state that exists following commencement but before completion of a pivotable actuation of the seat pan 106). The aircraft seat system 100a may include one or more extendable armrests 108 in an extended state. In some embodiments, the one or more extendable armrests 108 may include a down stop pocket 206 (see FIGS. 2A through 2C) configured to interact with a down stop 304 of the seat encasement 102. In this regard, the down stop 304 may be configured to stop a pivotable actuation of the one or more extendable armrests 108 (e.g., upon interaction of the down stop 304 with the down stop pocket 206). It is noted that the interaction of the down stop 304 with the down stop pocket 206 may prevent an undesired degree of pivotable actuation of the one or more extendable armrests 108. Upon commencement of a pivotable actuation of the seat pan 106, the seat pan 106 may be pivotably actuated until it comes into contact with the one or more extendable armrests 108, at which point a force exerted by the seat pan handle 302 on one or more portions of the one or more extendable armrests 108 may cause the one or more extendable armrests 108 to begin to pivotably actuate about the pivot pin 202. In this regard, the force exerted by the seat pan handle 302 on the one or more portions of the one or more extendable armrests 108 may cause the cessation of contact between the down stop pocket 206 and the down stop 304 (as shown in FIG. 3B, which illustrates an aircraft seat system 100b in a more progressed state of partial retraction relative to FIG. 3A).

FIG. 3C illustrates an aircraft seat system 100c in a partially-retracted state, where the one or more extendable armrests 108 are also in a partially-retracted state. For example, the armrest cap 208 of the one or more extendable armrests 108 may be partially retracted by the pivot link system and the rotator link system. In this regard, the force the force exerted by the seat pan handle 302 on the one or more portions of the one or more extendable armrests 108 may cause the spring 212 to exit a resting, stretched state, and may cause the spring 212 to retract the armrest cap 208.

Upon the completion of the retraction of the one or more extendable armrests 108, and upon completion of the pivotable actuation of the seat pan 106, the aircraft seat system 100a (as shown in FIG. 3D) may exist in a fully retracted and collapsed state. In this regard, the one or more extendable armrests 108 may be fully retracted, and the seat pan handle 302 may be nested within the armrest pocket 226. It is noted that the fully retracted and collapsed state may be configured to reduce the amount of space occupied by the aircraft seat system 100 within an aircraft cabin. In this regard, the fully retracted and collapsed state may be configured such that the aircraft seat system 100 may be compliant with all applicable safety rules, laws, and regulations regarding egress from an aircraft cabin.

It is noted that the seat encasement 102 may include one or more mechanisms configured to secure one or more portions of the aircraft seat system 100 in the fully retracted and collapsed state. For example, the seat encasement 102 may include one or more latches, locks, clips, ball detents, depressible buttons, or the like, configured to secure the seat pan 106, the one or more extendable armrests 108, the collapsible footrest 109.

It is noted that the various components of the aircraft seat system 100 (e.g., the headrest portion 104, the seat pan 106, the one or more extendable armrests 108, the collapsible footrest, or the like) may include one or more additional components configured to increase passenger comfort and/or provide one or more aesthetic appearances to the aircraft seat system 100. For example, the various components of the aircraft seat system may include one or more cushions, decorations, or the like.

As previously described, the aircraft seat system 100 may be transitionable between one or more positions. For example, the components of the one or more positions may include, but not limited to, a retracted and collapsed position, a partially-retracted position, a partially-extended position, and an extended position. It is noted herein that one or more of the retracted and collapsed position, the partially-retracted position, the partially-extended position, or the extended position may be considered a taxi, takeoff, or landing (TTOL) position during select stages of flight. In addition, it is noted herein that any position that does not meet the above-defined requirements of the TTOL position may be considered a non-TTOL position, for purposes of the present disclosure. Further, it is noted herein the aircraft seat system 100 may be actuatable (e.g., translatable and/or rotatable) from the TTOL position to a non-TTOL position, or vice versa (e.g., such as through the pivotable actuation processes described herein. It is noted that the retracted and collapsed position, a partially-retracted position, a partially-extended position, and extended position are not intended to be limiting upon the configuration of the aircraft seat system 100. For instance, the aircraft seat system 100 may be configured such that one or more components of the aircraft seat system 100 may be in a particular position (e.g., partially-extended position), while one or more other components are in a different position (e.g., extended position). In this regard, the above description should not be interpreted as a limitation on the present disclosure but merely an illustration.

The aircraft seat system 100 may be installed within a passenger compartment of an aircraft cabin. Although embodiments of the disclosure illustrate the aircraft seat system 100 as including a single aircraft seat, it is noted herein the aircraft seat system 100 may include multiple aircraft seats. For example, a plurality of aircraft seat systems 100 may be positioned adjacent to one another within an aircraft cabin. In this regard, the above description should not be interpreted as a limitation on the present disclosure but merely an illustration.

Although embodiments of the disclosure are directed to an avionics environment, it is noted herein that the aircraft seat system 100 is not limited to aircraft seats within the avionics environment and/or the aircraft components within the avionics environment. For example, the aircraft seat system 100 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include an automobile. By way of another example, the aircraft seat system 100 may be coupled to and/or configured to operate with apparatus sold for commercial or industrial use in either a home or a business. In this regard, the above description should not be interpreted as a limitation on the present disclosure but merely an illustration.

It is specifically noted that the embodiments of the present disclosure may be configured in accordance with aviation guidelines and/or standards put forth by the Federal Aviation Administration (FAA), the European Aviation Safety Agency (EASA), any other flight certification agency or organization, the American National Standards Institute (ANSI), Aeronautical Radio, Inc. (ARINC), the Society of Automotive Engineers (SAE), any other standards-setting organization, the Radio Technical Commission for Aeronautics (RTCA), any guidelines agency or organization, or the like.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

What is claimed:

1. An aircraft seat system, comprising:
   a seat casement;
   a headrest portion;
   a seat back portion;
   a seat pan pivotably coupled to one or more portions of the seat casement; and
   one or more armrests pivotably coupled to one or more portions of the seat casement via a pivot pin, wherein the one or more armrests are configured to be retractable upon a pivotable actuation of the seat pan, and wherein the one or more armrests comprise:
      an armrest body having a down stop pocket at a first end of the armrest body;

a rotator link system kinematically coupled to the armrest body and an armrest cap; and a pivot link system kinematically coupled to the armrest body and the armrest cap, wherein the pivot link system is configured to:
pivotably extend the armrest cap along a length of the armrest body toward a second end of the armrest body; and
pivotably retract the armrest cap along the length of the armrest body toward the first end of the armrest body.

2. The aircraft seat system of claim 1, wherein the seat pan comprises one or more seat pan handles configured to pivotably actuate the seat pan.

3. The aircraft seat system of claim 2, wherein the one or more seat pan handles are configured to be received by one or more armrest pockets formed within the armrest body.

4. The aircraft seat system of claim 1, wherein the rotator link system comprises:
an upper rotator link coupled to the armrest body via an upper rotator link shaft at an upper rotator link attachment; and
a lower rotator link coupled to the armrest body via a lower rotator link shaft at a lower rotator link attachment, wherein the lower rotator link is pivotably coupled to the upper rotator link via a rotator link shaft.

5. The aircraft seat system of claim 4, wherein the pivot link system comprises:
an upper pivot link coupled to the armrest body at an upper pivot link attachment via an upper pivot link shaft;
a lower pivot link coupled to the armrest body at a lower pivot link attachment via a lower pivot link shaft; and
a spring fixably coupled to the armrest body at a spring attachment, wherein the spring is elastically coupled to the lower pivot link, and wherein the spring is configured to cause the pivot link system to pivotably retract the armrest along the length of the armrest body toward the first end of the armrest body upon the pivotable actuation of the seat pan.

6. The aircraft seat system of claim 1, wherein the seat casement comprises one or detents configured to prevent a pivotable actuation of the one or more armrests.

7. The aircraft seat system of claim 1, wherein the headrest portion is actuatable along a plurality of headrest slide rails within one or more portions of the seat casement.

8. The aircraft seat system of claim 7, wherein the seat back portion is actuatable along a plurality of seat back slide rails within one or more portions of the seat casement.

9. The aircraft seat system of claim 8, wherein each of the headrest portion and the seat back portion is configured to actuate within one or more portions of the seat casement upon a pivotable actuation of the seat pan.

10. The aircraft seat system of claim 1, further comprising a collapsible footrest pivotably coupled to the seat pan.

11. An extendable armrest, comprising:
an armrest body having a down stop pocket at a first end of the armrest body;
a rotator link system kinematically coupled to the armrest body and an armrest cap; and
a pivot link system kinematically coupled to the armrest body and the armrest cap, wherein the pivot link system is configured to:
pivotably extend the armrest cap along a length of the armrest body toward a second end of the armrest body; and
pivotably retract the armrest cap along the length of the armrest body toward the first end of the armrest body.

12. The extendable armrest of claim 11, wherein the extendable armrest is pivotably coupled to one or more portions of a seat casement via a pivot pin, wherein the extendable armrest is configured to be retractable upon a pivotable actuation of a seat pan.

13. The extendable armrest of claim 12, wherein the rotator link system comprises:
an upper rotator link coupled to the armrest body via an upper rotator link shaft at an upper rotator link attachment; and
a lower rotator link coupled to the armrest body via a lower rotator link shaft at a lower rotator link attachment, wherein the lower rotator link is pivotably coupled to the upper rotator link via a rotator link shaft.

14. The extendable armrest of claim 13, wherein the pivot link system comprises:
an upper pivot link coupled to the armrest body at an upper pivot link attachment via an upper pivot link shaft;
a lower pivot link coupled to the armrest body at a lower pivot link attachment via a lower pivot link shaft; and
a spring fixably coupled to the armrest body at a spring attachment, wherein the spring is elastically coupled to the lower pivot link, and wherein the spring is configured to cause the pivot link system to pivotably retract the armrest along the length of the armrest body toward the first end of the armrest body upon the pivotable actuation of the seat pan.

15. The extendable armrest of claim 14, wherein the seat pan comprises one or more seat pan handles configured to pivotably actuate the seat pan.

* * * * *